United States Patent
Maeda

[11] 3,796,276
[45] Mar. 12, 1974

[54] CARRIAGES FOR TRANSPORTING HEAVY ARTICLES AND CONTROLLING POSITIONS THEREOF
[75] Inventor: Kazuo Maeda, Chiba, Japan
[73] Assignee: Mitsui Shipbuilding & Engineering Co., Ltd., Tokyo, Japan
[22] Filed: May 25, 1972
[21] Appl. No.: 256,973

[30] Foreign Application Priority Data
May 28, 1971 Japan.............................. 46-37192

[52] U.S. Cl. ................................. 180/8 C, 254/84
[51] Int. Cl............................................ B62d 57/02
[58] Field of Search.............. 254/84; 180/8 C, 8 R

[56] References Cited
UNITED STATES PATENTS
3,446,301  5/1969  Thomas............................ 180/8 C
3,576,225  4/1971  Chambers.......................... 180/8 C
3,512,597  5/1970  Baron............................... 180/8 C Primary Examiner—Othell M. Simpson
Assistant Examiner—Robert G. Watson
Attorney, Agent, or Firm—Charles E. Pfund; Chittick, Thompson & Pfund

[57] ABSTRACT

A carriage for transporting heavy articles comprises a base frame, a plurality of supporting legs secured to the base frame, a plurality of vertical fluid pressure cylinders connected to the lower surface of the base frame, a plurality of shoes, each connected to the lower end of the piston rod of the fluid pressure cylinder through a pair of cooperating slide members, one of them being disposed to be slidable in the longitudinal direction, whereas the other in the transverse direction of the shoe, and a plurality of fluid pressure piston-cylinder assemblies for moving the shoes in the transverse and longitudinal directions of the base frame.

6 Claims, 11 Drawing Figures

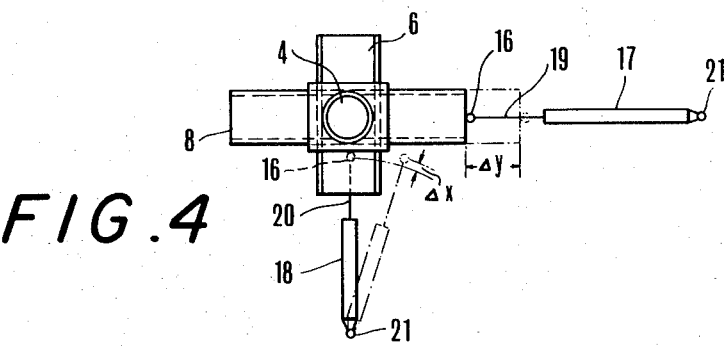
FIG.4
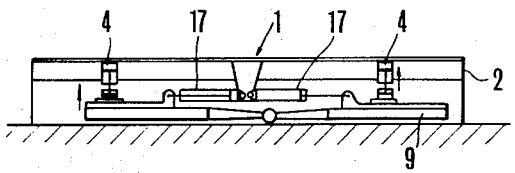
FIG.5
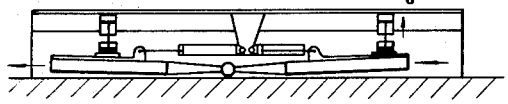
FIG.6
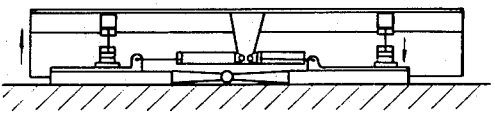
FIG.7
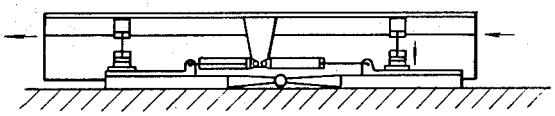
FIG.8
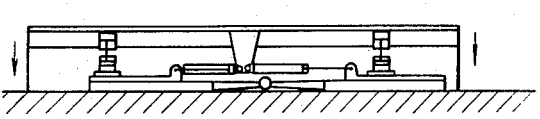
FIG.9
FIG.10   FIG.11
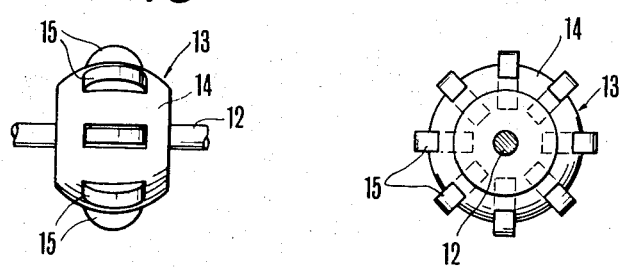

3,796,276

CARRIAGES FOR TRANSPORTING HEAVY ARTICLES AND CONTROLLING POSITIONS THEREOF

BACKGROUND OF THE INVENTION

This invention relates to a truck or carriage utilized to transport extremely heavy articles or structures such as prefabricated blocks for constructing ships in a dockyard.

A conventional carriage is provided with a plurality of wheels or catapillers wherein the grounding pressure is calculated by dividing the sum of the weight of the carriage and that of the load supported thereon with the effective grounding area so that there is a limit for the weight of the article that can be safely transported. More particularly, where an extremely heavy structure is loaded on the carriage the grounding pressure of the wheels becomes very large so that the ground surface is required to have a prohibitively large strength or the carriage is required to have a large member of wheels capable of supporting the huge pressure. However, the ratio of the grounding are of the wheels is limited to a very small value in view of the power efficiency. Also in the case of a carriage equipped with catapillers the effective pressure receiving surface is limited to the area under the influence of the supporting wheels. Moreover, the direction of movement of the conventional carriage is limited to the direction of the running wheels so that in order to vary the direction of movement of the carriage it is necessary to change and adjust the direction of the wheels by a complicated mechanism. To move the carriage in any direction not only it is necessary to give extremely complicated command signals but also the slip of the wheels at the time of turning which is inevitable owing to the width of the wheels results in a detrimental effect upon the ground surface and the wheels so that it is difficult to provide a fine and accurate movement of the carriage.

SUMMARY OF THE INVENTION

Accordingly, it is an object of this invention to provide a carriage that can safely transport extremely heavy objects and can be moved or adjusted accurately.

A further object of this invention is to provide an improved carriage having a much larger grounding surface than the conventional carriage thus eliminating the necessity of constructing running ways having a large load supporting capacity.

Still further object of this invention is to provide an improved carriage that can be moved or adjusted in three dimensions.

Another object of this invention is to provide an improved carriage capable of safely transporting or adjusting the position of heavy articles in a narrow space.

According to this invention there is provided a carriage for conveying articles of large weights comprising a base frame, a plurality of supporting legs secured to the lower surface of the base frame, a plurality of vertical fluid pressure cylinders connected to the lower surface of the base frame, a plurality of shoes, each connected to the lower end of the piston rod of one of the fluid pressure cylinders through a pair of cooperating slide members, one of the slide members being disposed to be slidable in the longitudinal direction, whereas the other in the transversal direction of the shoes, and a plurality of fluid pressure piston-cylinder assemblies for moving the shoes in the transversal and longitudinal directions of the base frame.

BRIEF DESCRIPTION OF THE DRAWINGS

In the accompanying drawings:

FIG. 4 is a diagrammatic top plan view of the piston and slide portion of the assembly shown in FIG. 3 illustrating components of motion;

FIGS. 5 through 9 are diagrammatic front elevation views of the carriage of this invention to illustrate motion of the carriage in various steps of its advancement;

FIG. 10 is a front elevation view of a composite wheel having a plurality of small auxiliary wheels and FIG. 11 is a side elevation view of the wheel shown in FIG. 10.

DESCRIPTION OF THE PREFERRED EMBODIMENT

Figure 1:
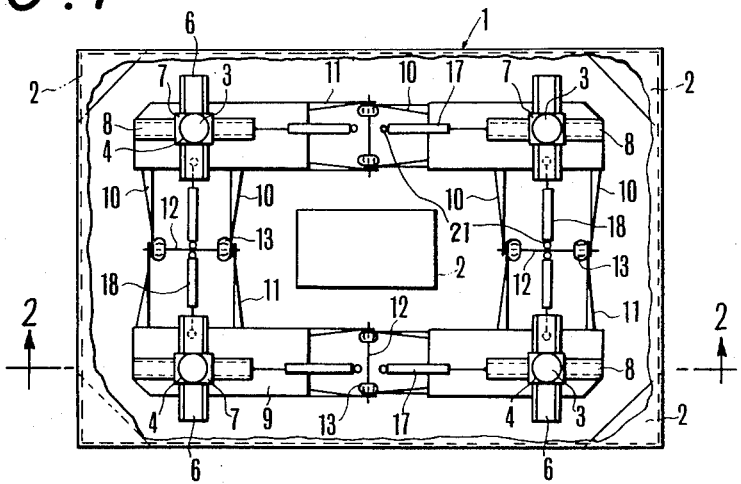
FIG. 1 is a top plan view of a carriage constructed according to the teaching of the invention with the frame broken away to show the mechanism.
Figure 2:
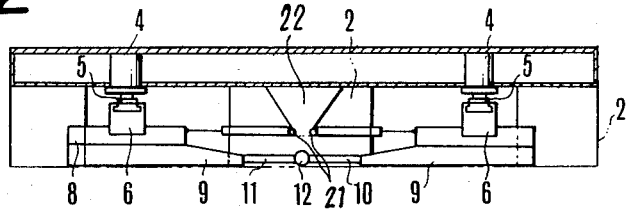
FIG. 2 shows a front elevation view of the carriage shown in FIG. 1 with the frame shown in section.

With reference now to FIGS. 1 and 2, a carriage embodying the invention comprises an inverted box shaped base frame 1 of a rectangular welded structure, a plurality of supporting legs 2 provided at four corners and the center of the base frame 1, each leg having a grounding area sufficient to carry the load. Four points 3 are selected in the area of the base frame 1 and four vertical cyclinders 4 are secured to the lower surface of the frame 1 at these points. The lower ends of pistons received in the cylinders 4 are coupled to transverse slides 6 through universal couplings 5. Each of the transverse slides 6 is slidably received in a slidable metal block 7 which is slidably mounted on a longitudinal slide table 8. Each slide table 8 is formed with an integral shoe 9 which is supported directly on the ground surface with a sufficiently large plane area.

Figure 3:
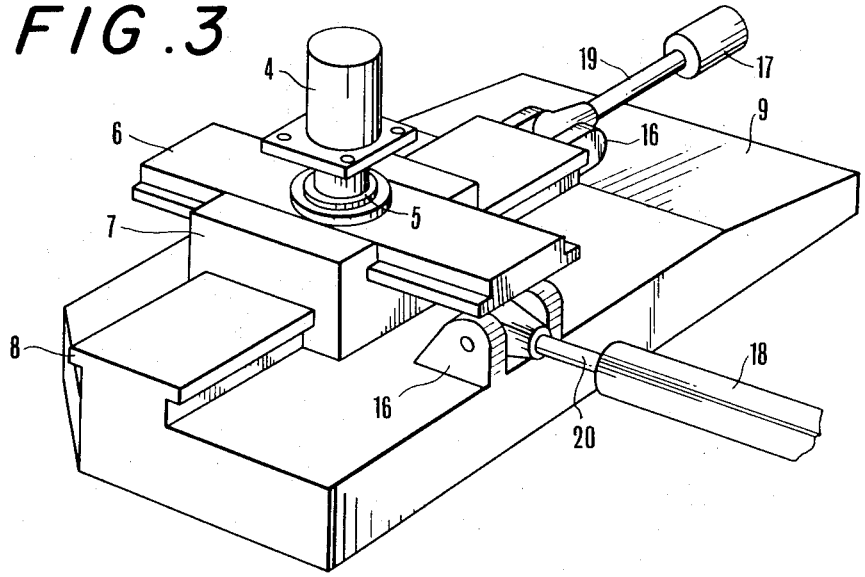
FIG. 3 is a perspective view showing oil pressure cylinders and a running shoe assembly at one supporting point for the carriage of FIG. 1.

Each pair of adjacent shoes 9 are interconnected by two links 10 and 11 in the transverse as well as longitudinal directions so that these shoes may be nearly maintained at a predetermined spacing. The inner ends of the opposing links 10 and 11 are connected together by means of a shaft 12 provided with composite wheels 13 having spherical surfaces. As best shown in FIGS. 10 and 11, each composite wheel 13 comprises a boss 14 rotatively mounted on shaft 12 and a plurality of auxiliary wheels 15 with their supporting shafts journalled in the boss 14 along a circle encircling the shaft 12, so that the composite wheel 13 does not resist the movement of the shaft 12 in any direction. As shown in FIG. 3, the inner ends of the piston rods 19 and 20 respectively received in a longitudinal cylinder 17 and a transverse cylinder 18 are connected to each shoe 9 through universal knuckle joints 16, and also the clevis end of each cylinder is connected to a member 22 depending from the base frame 1 by means of a universal joint 21. The base frame 1 contains a power unit, not shown, in the form of an internal combustion engine or the like. The power unit is used to drive an oil pump for supplying pressurized oil to all oil pressure systems as well as an electric generator for supplying control power to all electric apparatus.

The running operation of the carriage will be described hereunder with reference to FIGS. 5 through 9. Upon receiving an advance command signal, the piston rods of the vertical cylinders 4 are elevated over the same stroke to slightly raise respective shoes 9 above the ground surface as shown in FIG. 5. At this time, four longitudinal cylinders 17 are operated simultaneously to extend the piston rods in the foreword cylinders and to retract piston rods in the rearward cylinders so that shoes 9 are advanced to the foremost positions, as shown in FIG. 6. Then the piston rods of the four vertical cylinders 4 are moved downwardly to urge the four shoes 9 against the ground surface as shown in FIG. 7. Thereafter, the downward movement of the piston rods is still continued to lift up the base frame 1 on four shoes 9. Then the longitudinal cylinders 17 are operated in the opposite direction to advance the base frame 1 by the sliding movement of the blocks 7 along longitudinal slide tables 8 of shoes 9. At the end of the foreword stroke, the piston rods of the cylinders 4 are moved upwardly to raise shoes 9 with the result that the base frame 1 is lowered onto the ground surface as shown in FIG. 9. The piston rods are moved further upwardly to raise the shoes 9 from the ground surface thus resuming the condition shown in FIG. 5.

Rearward movement of the base frame is accomplished by reversing the order of operations of the longitudinal cylinders 17. In the same manner, the transverse cylinders 18 are operated for moving the base frame in the transverse direction. Where both transverse and longitudinal cylinders are operated simultaneously at a constant speed ratio, the base frame will be moved obliquely. Where the strokes of the piston rods of four longitudinal cylinders 17 and four transverse cylinders 18 are varied at such a correct ratio that four points 3 are rotated about the center of the base frame while it is lifted above the shoes 9, the base frame 1 of the carriage can be rotated with respect to the former position. Furthermore, where four vertical cylinders correctly respond to command signals it is possible to provide three dimensional attitude controls for the carriage.

The longitudinal cylinders 17 and the transverse cylinders 18 with their piston rods pivotally connected to respective shoes are mounted such that the axes of these cylinders intersect with each other at right angles when the shoes are brought to the neutral position with respect to the base frame 1 as shown in FIG. 4. Where the carriage is displaced y by the operation of longitudinal cylinders 17 it is necessary to displace the carriage by x by operating transverse cylinders 18. More particularly, the operation of the cylinder in one of three directions is related with the other two directions and should be performed in a complicated functional relationship for turning or otherwise moving the carriage. For running and attitude controls of the carriage, a geometrical analogue calculation is performed by using a model to provide length command signals to respective cylinders so as to control them by an oil pressure servomechanism. Thus, the effective length of the piston rods of respective cylinders is constantly measured and supervised and the measured length is fed back to the servomechanism.

As above described, according to this invention there is provided an improved carriage having much wider grounding area than the conventional carriage designed to run directly on the ground surface so that the carriage can safely transport extremely heavy articles such as prefabricated blocks for building ships without the necessity of considering severe conditions imposed upon the grounding surfaces of the wheels of the carriage and upon the axes of the wheels and constructing running ways having a large load carrying capacity. Furthermore, the novel carriage can be adjusted or moved in three dimensions which can never be attained by the conventional carriage supported by rolling wheels, thereby increasing in the flexibility of the operation of the carriage. Thus, the novel carriage is particularly suitable to transport heavy articles in narrow space and to adjust the position or attitude thereof.

Although the invention has been shown and described in terms of a particular embodiment thereof it will be clear that many changes and modifications are obvious to one skilled in the art without departing from the true spirit and scope of the invention as defined in the appended claims.

What is claimed is:

1. A carriage for transporting articles of large weights comprising a base frame, a plurality of supporting legs secured to the lower surface of said base frame, a plurality of vertical fluid pressure cylinders connected to the lower surface of said base frame, a plurality of shoes, means connecting each shoe to the lower end of the piston rod of one of said vertical fluid pressure cylinders said connecting means including a pair of cooperating slide members, one of said slide members being disposed to be slidable in the longitudinal direction and the other in the transverse direction of said shoes, and a plurality of fluid pressure piston-cylinder assemblies for moving said shoes in the transversal and longitudinal directions of said base frame.

2. The carriage according to claim 1 wherein said base frame takes the form of an inverted rectangular box and said supporting legs are provided at four corners and at the center of said base frame.

3. The carriage according to claim 1 wherein each shoe comprises an integral slide bed extending in the longitudinal direction of said shoe, one of said slide members is slidably mounted on said slide bed and is provided with a groove extending in the transverse direction of said shoe for slidably receiving the other slide member, and the lower end of the piston rod of one of said vertical fluid pressure cylinders is connected to said other slide member through a universal joint.

4. The carriage according to claim 1 wherein pairs of said fluid pressure piston-cylinder assemblies are provided between adjacent shoes in the longitudinal and transverse directions of said base frame, one end of the piston rod of each piston-cylinder assembly is pivotally connected to the shoe whereas the opposing ends of the cylinders of each pair of fluid pressure piston-cylinder assembly are pivotally connected to said base frame.

5. The carriage according to claim 1 wherein each adjacent pair of said shoes are interconnected by means of links in the longitudinal and transverse directions of said base frame.

6. The carriage according to claim 5 wherein the opposing ends of said links are interconnected by a shaft carrying a plurality of composite wheels, each composite wheel including a boss rotatably mounted on said shaft and a plurality of auxiliary wheels with there axes journalled in said boss along a circle encircling said shaft.

* * * * *